United States Patent
Hasegawa et al.

(10) Patent No.: US 11,735,216 B2
(45) Date of Patent: Aug. 22, 2023

(54) MAGNETIC RECORDING MEDIUM, METHOD OF MANUFACTURING SAME, AND MAGNETIC RECORDING AND REPRODUCING APPARATUS

(71) Applicant: SHOWA DENKO K.K., Tokyo (JP)

(72) Inventors: Kota Hasegawa, Chiba (JP); Yu Azuma, Chiba (JP)

(73) Assignee: RESONAC CORPORATION, Tokyo (JP)

( * ) Notice: Subject to any disclaimer, the term of this patent is extended or adjusted under 35 U.S.C. 154(b) by 107 days.

(21) Appl. No.: 16/907,676

(22) Filed: Jun. 22, 2020

(65) Prior Publication Data

US 2021/0005219 A1  Jan. 7, 2021

(30) Foreign Application Priority Data

Jul. 1, 2019  (JP) ................. 2019-123216

(51) Int. Cl.
*G11B 5/73* (2006.01)
*G11B 5/66* (2006.01)
*G11B 5/851* (2006.01)
*G11B 5/667* (2006.01)

(52) U.S. Cl.
CPC ............ *G11B 5/7379* (2019.05); *G11B 5/667* (2013.01); *G11B 5/851* (2013.01)

(58) Field of Classification Search
CPC ........ G11B 5/667; G11B 5/7379; G11B 5/851
See application file for complete search history.

(56) References Cited

U.S. PATENT DOCUMENTS

| 3,012,613 | A1 | 9/2011 | Takahashi et al. |
| 2001/0016272 | A1 | 8/2001 | Bian et al. |
| 2008/0268292 | A1 | 10/2008 | Das et al. |

FOREIGN PATENT DOCUMENTS

| CN | 1309386 | 8/2001 |
| CN | 101295516 | 10/2008 |
| JP | 2001-006158 | 1/2001 |
| JP | 2008-305466 | 12/2008 |

*Primary Examiner* — Holly Rickman
*Assistant Examiner* — Linda N Chau
(74) *Attorney, Agent, or Firm* — IPUSA, PLLC

(57) ABSTRACT

A magnetic recording medium includes a non-magnetic substrate; a soft magnetic layer; a first seed layer; a second seed layer; an underlayer; and a perpendicular magnetic recording layer. The soft magnetic layer, the first seed layer, the second seed layer, the underlayer and the perpendicular magnetic recording layer are disposed on the non-magnetic substrate in this order. The first seed layer includes $MoS_2$, hexagonal-BN, $WS_2$, $WSe_2$ or graphite. The second seed layer includes AlN having a hexagonal wurtzite type crystal structure. The underlayer includes Ru.

7 Claims, 1 Drawing Sheet

MAGNETIC RECORDING MEDIUM, METHOD OF MANUFACTURING SAME, AND MAGNETIC RECORDING AND REPRODUCING APPARATUS

CROSS-REFERENCE TO RELATED APPLICATIONS

This application is based upon and claims priority to Japanese Patent Application No. 2019-123216, filed on Jul. 1, 2019, the entire contents of which are incorporated herein by reference.

BACKGROUND OF THE INVENTION

1. Field of the Invention

The present invention relates to a magnetic recording medium, a method of manufacturing a magnetic recording medium, and a magnetic recording and reproducing apparatus.

2. Description of the Related Art

In recent years, as the scope of application of magnetic disk devices has expanded and its importance has increased, enhancement of the recording density of magnetic recording medium used in magnetic disk devices has been attempted.

In a magnetic recording medium, in general, on a non-magnetic substrate, a seed layer, an underlayer, a vertical magnetic recording layer, and a protective layer are deposited in this order. Also, in many cases, a soft magnetic layer is deposited between the non-magnetic substrate and the seed layer of a magnetic recording medium. Here, the underlayer is deposited in order to enhance the crystal orientation of the vertical magnetic recording layer, and the seed layer is enhanced in order to enhance the crystal orientation of the underlayer.

In order to enhance the recording density of a magnetic recording medium, the crystal orientation of the vertical magnetic recording layer is important. In many cases, a vertical magnetic recording layer is composed of a material having an hcp structure (hexagonal close-packed structure). It is important that the (002) crystal plane is parallel to the surface of the substrate. In other words, it is important the c-axis, which is the [002] axis, is oriented in a direction perpendicular to the surface of the substrate.

Conventionally, in order to enhance the crystal orientation of the material constituting a vertical magnetic recording layer, as the material constituting the underlying layer, similar to the vertical magnetic recording layer, Ru having a hcp structure is used (see, for example, Patent Document 1). On the (002) crystal plane of Ru, crystals of the material constituting the vertical magnetic recording layer are epitaxially grown. Therefore, the crystal orientation of the material constituting the vertical magnetic recording layer can be enhanced.

Although a seed layer is required to have a property of enhancing the crystal orientation of the underlayer, AlN having a hexagonal crystal wurtzite type crystal structure is used as a seed layer (see, for example, Patent Document 2).

RELATED-ART DOCUMENTS

Patent Documents

[Patent Document 1] Japanese Laid-open Patent Publication No. 2001-6158

[Patent Document 2] Japanese Laid-open Patent Publication No. 2008-305466

In this case, when AlN is deposited to form the seed layer, a MOCVD method is generally used, and the temperature of a non-magnetic substrate needs to be increased. Also, in a case in which a soft magnetic layer is deposited between a substrate and a seed layer, it is preferable that the soft magnetic layer has an amorphous structure in order to enhance the crystal orientation of an underlayer.

However, when the temperature of the non-magnetic substrate is increased when AlN is deposited, there is a problem that the material constituting the soft magnetic layer crystallizes.

Although using a reactive sputtering method enables to deposit an AlN film with reducing the temperature of the non-magnetic substrate, it is desirable to further enhance the crystal orientation of the AlN.

One aspect of the present invention is to provide a magnetic recording medium in which the crystal orientation of an underlayer and a vertical magnetic recording layer is high.

SUMMARY OF THE INVENTION (1) A magnetic recording medium includes a non-magnetic substrate; a soft magnetic layer; a first seed layer; a second seed layer; an underlayer; and a perpendicular magnetic recording layer, wherein the soft magnetic layer, the first seed layer, the second seed layer, the underlayer and the perpendicular magnetic recording layer are disposed on the non-magnetic substrate in this order, wherein the first seed layer includes $MoS_2$, h-BN, $WS_2$, $WSe_2$ or graphite, wherein the second seed layer includes AlN having a hexagonal wurtzite type crystal structure, and wherein the underlayer includes Ru.

(2) In the magnetic recording medium according to (1), the second seed layer has an average crystal grain size within a range of 3 nm to 12 nm.

(3) In the magnetic recording medium according to (1) or (2), the second seed layer has a thickness within a range from 0.5 nm to 20 nm.

(4) In the magnetic recording medium according to any one of (1) to (3), the soft magnetic layer has an amorphous structure.

(5) A method of manufacturing the magnetic recording medium according to any one of (1) to (4) includes: depositing the second seed layer by a reactive sputtering method using a pulse voltage, wherein, when depositing the second seed layer, the pulse voltage is less than or equal to −300 V, a pulse current is greater than or equal to 10 A, a duty cycle is less than or equal to 10%, Al is used as a target, and nitrogen is used as a sputtering gas.

(6) A method of manufacturing the magnetic recording medium according to any one of (1) to (4) includes: depositing the second seed layer by a reactive sputtering method using hollow cathode plasma, wherein, when depositing the second seed layer, Al is used as a target, and nitrogen is used as a sputtering gas.

(7) A magnetic recording and reproducing apparatus includes the magnetic recording medium according to any one of (1) to (4).

According to one aspect of the present invention, it is possible to provide a magnetic recording medium in which the crystal orientation of an underlayer and a vertical magnetic recording layer is high.

DESCRIPTION OF THE PREFERRED EMBODIMENTS

Figure 1:
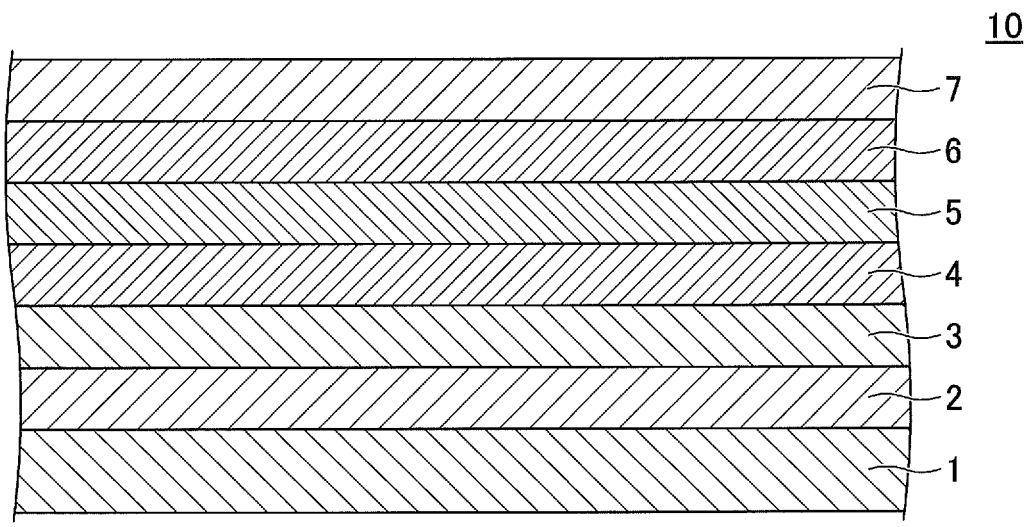
FIG. 1 is a cross-sectional view illustrating an example of a structure of a magnetic recording medium according to an embodiment.

In the following, an embodiment of the present invention will be described with reference to the accompanying drawings. Note that in the drawings used in the following description, portions that are features may be enlarged in order to make the features easy to understand for convenience, and the dimensional ratios of respective components may not be the same as in the drawings.

[Magnetic Recording Medium]

FIG. 1 illustrates an example of a structure of a magnetic recording medium 10 according to the present embodiment.

The magnetic recording medium 10 includes, on a non-magnetic substrate 1, a soft magnetic layer 2, a first seed layer 3, a second seed layer 4, an underlayer 5, a perpendicular magnetic recording layer 6, and a protective layer 7 in this order. The first seed layer 3 includes $MoS_2$, h-BN (hexagonal boron nitride), $WS_2$, $WSe_2$ or graphite. The second seed layer 4 includes AlN having a hexagonal wurtzite type crystal structure. The underlayer 5 includes Ru.

Because the magnetic recording medium 10 has such a layered structure, the (002) plane orientation of the underlayer 5 can be enhanced, and as a result, the c-axis orientation of the perpendicular magnetic recording layer 6 can be enhanced. Therefore, it is possible to enhance the recording density of the magnetic recording medium 10.

In the magnetic recording medium 10, in order to enhance the (002) plane orientation of the underlayer 5, AlN having a hexagonal wurtzite type crystal structure is used as a material constituting the second seed layer 4. Here, by using seed layers of a two layered structure of the first seed layer 3 and the second seed layer 4, even when the second seed layer 4 is deposited with reducing the temperature of the non-magnetic substrate 1, the (002) plane orientation of the second seed layer 4 can be enhanced. That is, by using $MoS_2$, h-BN, $WS_2$, $WSe_2$, or graphite as the material constituting the first seed layer 3, even when the second seed layer 4 is deposited with reducing the temperature of the non-magnetic substrate 1, the (002) plane orientation of the second seed layer 4 can be enhanced. It is considered that this is because the materials constituting the first seed layer 3 and the second seed layer 4 are hexagonal and the lattice mismatch is small (see Table 1). Therefore, AlN that constitutes the second seed layer 4 is easily heteroepitaxially grown on the surface of the first seed layer 3.

TABLE 1

| | LATTICE CONSTANT a [nm] |
|---|---|
| AlN | 0.311 |
| $MoS_2$ | 0.316 |
| h-BN | 0.250 |
| $WS_2$ | 0.317 |
| $WSe_2$ | 0.328 |
| GRAPHITE | 0.246 |

Examples of the material constituting the non-magnetic substrate 1 include an Al alloy such as an AlMg alloy, soda glass, aluminosilicate-based glass, amorphous glass, silicon, titanium, ceramics, sapphire, quartz, resin, and the like. Among these, an Al alloy or glass, such as crystallized glass or amorphous glass is preferable.

When recording a signal on the magnetic recording medium 10, the soft magnetic layer 2 is deposited in order to guide a recording magnetic field from the magnetic head and efficiently apply a vertical component of the recording magnetic field to the perpendicular magnetic recording layer 6.

Examples of the material constituting the soft magnetic layer 2 include a soft magnetic alloy such as a FeCo-based alloy, a CoZrNb-based alloy, and a CoTaZr-based alloy.

The soft magnetic layer 2 preferably has an amorphous structure. Therefore, it is possible to enhance the surface smoothness of the soft magnetic layer 2, and as a result, it is possible to reduce the floating amount of the Magnetic head, and it is possible to further enhance the recording density of the magnetic recording medium 10.

It should be noted that, via non-magnetic layers, such as a Ru film, a plurality of soft magnetic layers 2 may be deposited as anti-ferromagnetic coupling (AFC) films.

The total thickness of the soft magnetic layer 2 is appropriately determined by the balance between the recording and reproduction characteristics and the OW (Over Write) characteristics of the magnetic recording medium 10, and is in the range of about 20 nm to 120 nm.

The first seed layer 3 is deposited in order to enhance the (002) plane orientation of the second seed layer 4 and includes $MoS_2$, h-BN, $WS_2$, $WSe_2$, or graphite.

$MoS_2$, h-BN, $WS_2$, and WSe, are hexagonal but preferably are c-axis oriented. In addition, it is preferable that h-BN and graphite are c-axis oriented.

The thickness of the first seed layer 3 is preferably in the range of 0.2 nm to 20 nm, and is more preferably in the range of 3 nm to 10 nm.

The second seed layer 4 is deposited in order to enhance the (002) plane orientation of the underlayer 5 and includes AlN having a hexagonal wurtzite type crystal structure.

Although the method of depositing the second seed layer 4 is not particularly limited, a sputtering method, a reactive sputtering method, or the like can be used as the method of depositing the second seed layer 4. Among these, a method using a high excitation source, such as a reactive sputtering method using a pulse voltage or a reactive sputtering method using hollow cathode plasma, is preferable. By using a high excitation source, even when the temperature of the non-magnetic substrate 1 is reduced, high density ions and radicals can be generated, and as a result, the (002) plane orientation of the second seed layer 4 can be enhanced.

In a case in which the second seed layer 4 is deposited by the reactive sputtering method, Al is used as a target and nitrogen is used as a sputtering gas, but a mixture gas of nitrogen and argon is preferably used as the sputtering gas. Here, the volume ratio of nitrogen to argon in the mixture gas is preferably in the range of 1:0.5 to 1:3.

In a case in which the second seed layer 4 is deposited by the reactive sputtering method using a pulse voltage, the pulse voltage is less than or equal to −300 V and is preferably less than or equal to −500 V, the pulse current is greater than or equal to 10 A and is preferably greater than or equal to 20 A, and the duty cycle is less than or equal to 10%.

The average crystal grain size of the second seed layer 4 is preferably in the range of 3 nm to 12 nm. By making the average crystal grain size of the second seed layer 4 in such a range, the (002) plane orientation of the underlayer 5 can be further enhanced.

It should be noted that the average crystal grain size can be measured using a planar TEM image.

The thickness of the second seed layer 4 is preferably in the range of 0.5 nm to 20 nm, and is more preferably in the range of 3 nm to 10 nm. By making the thickness of the second seed layer 4 in such a range, the underlayer 5 can be stably oriented in the (002) plane.

The underlayer 5 is deposited to enhance the (002) plane orientation of the perpendicular magnetic recording layer 6 and includes Ru.

As the material constituting the underlayer 5, Ru having a hcp structure or an alloy thereof can be used.

The average crystal grain size of the underlayer is preferably in the range of 6 nm to 20 nm, and is more preferably in the range of 6 nm to 8 nm.

It is preferable that the thickness of the underlayer 5 is in the range of about 5 to 30 nm.

It should be noted that because the crystal orientation of the perpendicular magnetic recording layer 6 is almost determined by the crystal orientation of the underlayer 5, it is extremely important to control the crystal orientation of the underlayer 5 when manufacturing the magnetic recording medium 10.

The perpendicular magnetic recording layer 6 is a layer in which signals are recorded.

Examples of the material constituting the perpendicular magnetic recording layer 6 include a Co-based alloy material such as CoCr, CoCrPt, CoCrPt—$B_2O_3$, CoCrPt—$SiO_2$, CoCrPt—$Cr_2O_3$, CoCrPt—$TiO_2$, CoCrPt—$ZrO_2$, CoCrPt—$Nb_2O_5$, COCrPt—$Ta_2O_5$, and CoCrPt—$TiO_2$.

In a case in which the perpendicular magnetic recording layer 6 contains an oxide, the oxide surrounds the crystal grains of the Co-based alloy to form a granular structure, thereby reducing the magnetic interaction between the crystal grains of the Co-based alloy and reducing noise. Finally, the crystal structure and the magnetic property of the perpendicular magnetic recording layer 6 determine the recording and reproducing characteristics of the magnetic recording medium 10.

In a case in which the perpendicular magnetic recording layer 6 has a granular structure, it is preferable that when the underlayer 5 is deposited, the sputtering gas pressure is increased to form a protrusion/recess portion on the surface of the underlayer 5. Thus, the oxide constituting the perpendicular magnetic recording layer 6 collects in a recess portion of the surface of the underlayer 5 and forms a granular structure. As a result, while maintaining the crystal orientation of the perpendicular magnetic recording layer 6, it is possible to manufacture the magnetic recording medium 10 with low noise in which the magnetic crystals of the Co-based alloy are isolated by the oxide.

Normally, as a method of depositing the soft magnetic layer 2, the first seed layer 3, the underlayer 5, and the perpendicular magnetic recording layer 6, a DC magnetron sputtering method or an RF sputtering method is used. When depositing the soft magnetic layer 2, the first seed layer 3, the underlayer 5, and the perpendicular magnetic recording layer 6, RF bias, DC bias, pulse DC, pulse DC bias, $O_2$ gas, $H_2O$ gas, and $N_2$ gas may be used, if necessary. The sputtering gas pressure is adjusted as appropriate to optimize the characteristics of each layer, and is usually in the range of about 0.1 Pa to 30 Pa.

The protective layer 7 is deposited to protect the magnetic recording medium 10 from damage caused by contact between the magnetic head and the magnetic recording medium 10, and in many cases, the protective layer 7 includes carbon.

Examples of the method of depositing the protective layer 7 include a sputtering method, a plasma CVD method, an ion beam method, and the like.

The thickness of the protective layer 7 is usually in the range of about 1 nm to 10 nm and is preferably in the range of about 2 nm to 6 nm.

Magnetic Recording and Reproducing Apparatus

Figure 2:
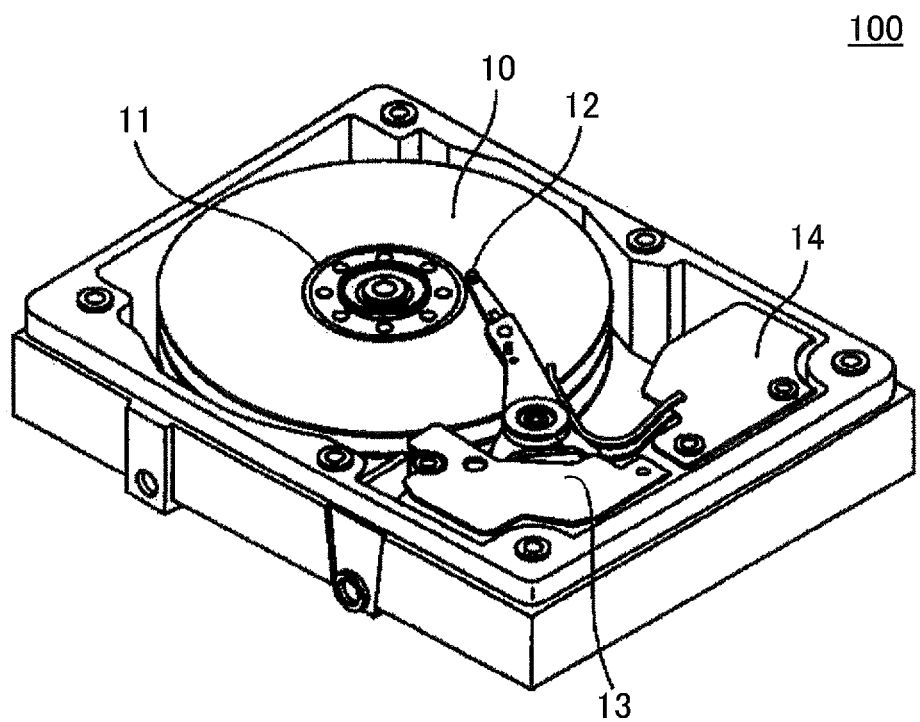
FIG. 2 is a schematic diagram illustrating an example of a magnetic recording and reproducing apparatus according to the embodiment.

FIG. 2 is a schematic diagram illustrating an example of a magnetic recording and reproducing apparatus 100 according to the present embodiment.

The magnetic recording and reproducing apparatus 100 includes a magnetic recording medium 10 according to the embodiment, a medium driving part 11 that drives the magnetic recording medium 10 to rotate, a magnetic head 12 that records data on the magnetic recording medium 10 or reproduces data recorded on the magnetic recording medium 10, a head driving part 13 that moves the magnetic head 12 relative to the magnetic recording medium 10, and a recording and reproducing signal processing system 14.

The recording and reproducing signal processing system 14 can process data input from the outside and transmit a recording signal to the magnetic head 12, and can process a reproducing signal from the magnetic head 12 and transmit data to the outside.

A magnetic head, including a Giant MagnetoResistance (GMR) element utilizing a GMR effect as a reproducing element, suitable for the high recording density can be used as the magnetic head 12.

EXAMPLES

In the following, Examples of the present invention will be described.

Example 1

A cleaned non-magnetic substrate made of glass and having an outer diameter of 2.5 inches (manufactured by HOYA Corporation) was put in a film deposition chamber of a DC magnetron sputtering apparatus C-3040 (manufactured by Anelva Corporation), and the film deposition chamber was evacuated until the ultimate vacuum reached $1 \times 10^{-5}$ Pa.

Next, as a target, using Cr50Ti {the content of Ti is 50 at % with the balance of Cr}, by a DC magnetron sputtering method, an adhesion layer having a thickness of nm was deposited on the non-magnetic substrate.

Next, as a target, using Co20Fe5Zr5Ta (the content of Fe is 20 at %, the content of Zr is 5 at %, the content Ta is 5 at %, with the balance of Co), setting the temperature of the non-magnetic substrate to be less than or equal to 100° C., by a DC magnetron sputtering method, a soft magnetic layer having a thickness of 25 nm was deposited on the adhesion layer.

Next, as a target, using Ru, by a DC magnetron sputtering method, a non-magnetic layer having a thickness of 0.7 nm was deposited on the soft magnetic layer.

Next, as a target, using Co20Fe5Zr5Ta, setting the temperature of the non-magnetic substrate to be less than or equal to 100° C., by a DC magnetron sputtering method, a soft magnetic layer having a thickness of 25 nm was deposited on non-magnetic layer.

Next, as a target, using $MoS_2$, setting the temperature of the non-magnetic substrate to be 250° C., by a DC magnetron sputtering method, a first seed layer having a thickness of 5 nm was deposited on the soft magnetic layer. At this time, Ar was used as the sputtering gas and the sputtering gas pressure was set to be 0.2 Pa.

Next, as a target, using Al, setting the temperature of the non-magnetic substrate to be 250° C., by a reactive sputtering method using a pulse voltage, a second seed layer having a thickness of 5 nm was deposited on the first seed layer. At this time, the pulse voltage applied to the target was set to be −500 V, the pulse current was set to be 30 A, the duty cycle was set to be 5%, a mixture gas of nitrogen and argon (mixed volume ratio: 1:1) was used as the sputtering gas, and the sputtering gas pressure was set to be 0.2 Pa.

Next, as a target, using Ru, setting the temperature of the non-magnetic substrate to be a room temperature, by a DC magnetron sputtering method, an underlayer having a thickness of 20 nm was deposited on the second seed layer. At this time, the first layer having a thickness of 10 nm was deposited by using an Ar gas as the sputtering gas and setting the sputtering gas pressure to be 0.9 Pa. Thereafter, the second layer having a thickness of 10 nm was deposited by setting the sputtering gas pressure to be 10 Pa.

Next, as a target, using $(Co15Cr18Pt)-6(SiO_2)-3(TiO_2)$ {the content of $SiO_2$ is 6 mol %, the content of $TiO_2$ is 3 mol %, with the balance of CoCrPt alloy (the content of Cr is 15 at %, the content of Pt is 18 at %, with the balance of Co)}, by a DC magnetron sputtering method, a vertical magnetic recording layer having a thickness of 9 nm and having a granular structure was deposited on the underlayer. At this time, an Ar gas was used as the sputtering gas and the sputtering gas pressure was set to be 2 Pa.

Next, by an ion beam method, a protective layer having a thickness of 3 nm was formed on the vertical magnetic recording layer such that a magnetic recording medium was obtained.

Examples 2 to 5

With the exception of using, as targets, h-BN (Example 2), $WS_2$ (Example 3), $WSe_2$ (Example 4), and graphite (Example 5) when forming the first seed layers, the magnetic recording mediums were obtained similarly to Example 1.

Example 6

With the exception of using a DC magnetron sputtering method when forming the second seed layer, the magnetic recording medium was obtained similarly to Example 1. At this time, the input power was set to be 600 W and the sputtering gas pressure was set to be 0.6 Pa.

Example 7

With the exception of using a reactive sputtering method using hollow cathode plasma when forming the second seed layer, the magnetic recording medium was obtained similarly to Example 1. At this time, a rectangular target is provided opposite, a pulse DC was applied, as a voltage, to the target, the input power was set to be 1000 W, and the sputtering gas pressure was set to be 0.4 Pa.

Comparative Examples 1 to 3

With the exception of not forming the first seed layer, the magnetic recording mediums were obtained similarly to Examples 1, 6, and 7, Here, when the magnetic recording mediums were manufactured, the crystal orientation of the second seed layer, the underlayer, and the vertical magnetic recording layer was evaluated.

(Crystal Orientation)

The c-axis orientation of each layer after depositing the second seed layer, the underlayer, and the vertical magnetic recording layer was evaluated using the half width ($\Delta\theta_{50}$) [°] of the rocking curve of X-ray diffraction. Specifically, an X-ray diffractometer was used to analyze the crystal plane parallel to the surface of the non-magnetic substrate after each layer was formed, and a peak corresponding to the (002) plane was observed. At this time, as the value of $\Delta\theta_{50}$ decreases, the c-axis orientation of each layer increases.

Table 2 indicates the evaluation results of the crystal orientation of each layer.

TABLE 2

| | FIRST SEED LAYER COMPOSITION | SECOND SEED LAYER REACTIVE SPUTTERING METHOD | $\Delta\theta_{50}$ | UNDERLAYER $\Delta\theta_{50}$ | PERPENDICULAR MAGNETIC RECORDING $\Delta\theta_{50}$ |
|---|---|---|---|---|---|
| E1 | $MoS_2$ | PULSE VOLTAGE | 0.7 | 1.3 | 1.8 |
| E2 | h-BN | PULSE VOLTAGE | 0.8 | 1.5 | 2.6 |
| E3 | $WS_2$ | PULSE VOLTAGE | 0.8 | 1.8 | 2.3 |
| E4 | $WSe_2$ | PULSE VOLTAGE | 1.0 | 2.1 | 2.4 |
| E5 | GRAPHITE | PULSE VOLTAGE | 1.1 | 2.3 | 2.7 |
| E6 | $MoS_2$ | DC MAGNETRON SPUTTERING METHOD | 2.5 | 3.5 | 4.0 |
| E7 | $MoS_2$ | HOLLOW CATHODE PLASMA | 0.7 | 1.2 | 1.7 |
| CE1 | — | PULSE VOLTAGE | 2.9 | 2.7 | 3.2 |
| CE2 | — | DC MAGNETRON SPUTTERING METHOD | 3.5 | 3.9 | 4.4 |
| CE3 | — | HOLLOW CATHODE PLASMA | 2.9 | 2.6 | 3.0 |

From Table 2, it can be seen that, for each of the magnetic recording mediums of Examples 1 to 7, the crystal orientation of the second seed layer, the underlayer, and the vertical magnetic recording layer is high.

On the other hand, because the first seed layer was not formed in the magnetic recording mediums of Comparative Examples 1 to 3, which were obtained in the same manner as in Examples 1, 6, and 7 except that the first seed layer was not formed, the crystal orientation of the second seed layer, the underlying layer, and the vertical magnetic recording layer of Comparative Examples 1 to 3 is respectively lower than that of the magnetic recording mediums of Examples 1, 6, and 7, which are in the same condition except that the first seed layer was formed.

What is claimed is:

1. A magnetic recording medium comprising:
    a non-magnetic substrate;
    a soft magnetic layer;
    a first seed layer;
    a second seed layer;
    an underlayer; and
    a perpendicular magnetic recording layer,
    wherein the soft magnetic layer, the first seed layer, the second seed layer, the underlayer and the perpendicular magnetic recording layer are disposed on the non-magnetic substrate in this order,
    wherein the first seed layer includes, as a main component, $MoS_2$, $WS_2$, $WSe_2$ or graphite,
    wherein the second seed layer includes, as a main component, AlN having a hexagonal wurtzite type crystal structure,
    wherein the underlayer includes Ru, and
    wherein the second seed layer is directly deposited on the first seed layer by a reactive sputtering method using a pulse voltage or by a reactive sputtering method using hollow cathode plasma.

2. The magnetic recording medium according to claim 1, wherein the second seed layer has an average crystal grain size within a range of 3 nm to 12 nm.

3. The magnetic recording medium according to claim 1, wherein the second seed layer has a thickness within a range from 0.5 nm to 20 nm.

4. The magnetic recording medium according to claim 1, wherein the soft magnetic layer has an amorphous structure.

5. A method of manufacturing the magnetic recording medium according to claim 1, the method comprising:
    depositing the second seed layer by the reactive sputtering method using a pulse voltage,
    wherein, when depositing the second seed layer, the pulse voltage is less than or equal to −300 V, a pulse current is greater than or equal to 10 A, a duty cycle is less than or equal to 10%, Al is used as a target, and nitrogen is used as a sputtering gas.

6. A method of manufacturing the magnetic recording medium according to claim 1,
    depositing the second seed layer by the reactive sputtering method using hollow cathode plasma,
    wherein, when depositing the second seed layer, Al is used as a target, and nitrogen is used as a sputtering gas.

7. A magnetic recording and reproducing apparatus comprising:
    the magnetic recording medium according to claim 1.

* * * * *